3,449,375
N,N - BIS(2,3 - EPOXYPROPYL)TRIHALOANILINES AND COMPOSITIONS CONTAINING THE SAME
Herbert A. Newey, Lafayette, Calif., assignor to Shell Oil Company, New York, N.Y., a corporation of Delaware
No Drawing. Filed May 27, 1966, Ser. No. 553,302
Int. Cl. C07d 1/00; C08g 30/02
U.S. Cl. 260—348            1 Claim

ABSTRACT OF THE DISCLOSURE

Novel flame-retardant resins having the general formula

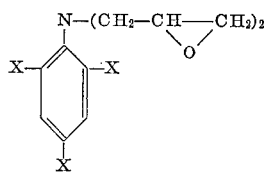

wherein X is chloride or bromide, are prepared by reacting a trihalo-substituted aniline with epichlorohydrin and dehydrochlorinating the resulting product.

---

This invention relates to flame retardant epoxy resins having outstanding physical properties. More particularly, the invention relates to diglycidyl derivatives of trihalogenated aniline.

Epoxy resins have become widely used in preparing a large number of products such as castings, coatings, laminates, foams and the like.

One group of outstanding epoxy resins due to their properties are the polyglycidyl ethers of polyhydric phenols prepared by reacting an epoxy halo-substituted alkane such as epichlorohydrin with a polyhydric phenol and especially a polynuclear polyhydric phenol. Such resins yield products which have high physical strength, excellent chemical resistance and good electrical properties. However, like the other epoxy resins, they are not flame retardant. These resins when cured form materials that have a number of desirable properties. However, one of the important shortcomings of such resins is their susceptibility to burning when exposed to flame or intense heat. This drawback obviously restricts the use of the epoxy resins where fire retardancy is desired.

A number of available materials such as phosphates, metal carboxylate salts and inorganic compounds impart flame retardant properties when added to resin compositions. However, such materials do not cure with the curing agents used for the epoxy resins and if curable at all require the use of a different curing agent thereby complicating the preparation of the resin products. As a result, such flame retardant additives do not enter into the cross-linked structure of the cured epoxy resins thereby upsetting the homogeneity and strength of the cured products.

In order to overcome these disadvantages a number of epoxy containing flame retardants have been used. In this manner, the epoxy containing flame retardant additive is co-cured with the epoxy resin thereby incorporating flame retardant materials into the molecular structure of the cured resin.

Halogen containing epoxy resins are found generally to be good flame retardant materials provided the halogen content of the materials is high enough. The halogenated epoxy resins usually do not have many of the desirable properties of the non-halogenated epoxy resins. However, mixtures of the two types of resins may result in a composition which when cured still possesses the flame retardancy of the halogenated resin without greatly sacrificing the desirable properties of the non-halogenated resin. Although satisfactory epoxy resin compositions of this type have been prepared hertofore it has been found that where the halogen content of the resin mixture is such as to provide for suitable flame retardancy, high viscosities result and in many cases the mixture is solid at room temperature. This high viscosity is generally due to the nature of the halogenated epoxy resins which, when added even to lower viscosity epoxy resins, results in very viscous or solid mixtures. While for some resin applications such high viscosities may not be unacceptable, for many processes low viscosity resin mixtures are not only desirable but necessary. For example, in preparing pottings or laminates where a liquid resin at room temperature is desired in order to penetrate the materials to be impregnated, a very viscous or solid resin is unsuitable. In many molding and casting operations, room temperature processes are desired for longer pot life. While the highly viscous or solid resin compositions, which generally also contain the curing agent, may be made more liquid by raising the temperature, the use of the higher temperature hastens curing thereby causing the composition to harden before the desired impregnation or mold shape is attained. Thus, room temperature operations are often desired in order to allow better control of the resin and its cure during the processing.

There has now been found a flame retardant epoxy resin that when mixed with other epoxy resins provides compositions that have low viscosities at room temperature highly suitable for impregnating, potting, casting, etc. The epoxy resins of this invention are those represented by the formula

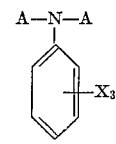

wherein A is an epoxy alkyl group and wherein X is chlorine or bromine. The preferred compounds of this class of resins are N,N-bis(2,3-epoxypropyl) tribromoaniline and N,N-bis(2,3-epoxypropyl) trichloroaniline. Generally, the halogens will be in the ortho and para positions.

These resins may be prepared by any suitable method. One such method is to react trihaloaniline with epoxyhalo-substituted alkane such as epichlorohydrin, epibromohydrin, 1,4-dichloro - 2,3 - epoxybutane, etc. Epichlorohydrin is preferred because of its availability and reactivity. Catalysts may be used in the reaction such as acetic acid, stannous octoate, and the like. The dichlorohydrin intermediate is then treated with a strong base and the diepoxide is produced. The amount of epichlorohydrin used should be 2 moles for each mole of trihaloaniline in order to prepare the diglycidyl ether. It may be preferable to use an excess of epichlorohydrin to ensure complete formation of the dichlorohydrin intermediate. In treating the dichlorohydrin intermediate, strong bases such as the alkali and alkaline earth metal hydroxide are suitable.

The resins of this invention in addition to being flame retardant and affording low viscosities to other epoxy resins they are compounded with offer other outstanding and unexpected properties. These resins when cured have very high compressive strength while also having good heat distortion points, flexural strength and tensile strength. In addition these resins when cured alone or with other materials have outstanding solvent and water resistance when compared to other well known and commercially available epoxy resins. The combination of the fine properties of the resins of this invention make them suitable for use alone or with other resins in preparing cured products where flame retardancy, high strength and water and solvent resistance are desired. Thus, in preparing flame retardant resin mixtures with other non-flame retardant resins, instead of necessitating care so that the physical properties of the non-flame retardant resin will not be diminished as is usually the case, the resins of this invention increase the overall strength and chemical and solvent resistance of such compositions as well as providing flame retardancy.

Although, in preparing mixtures of the trihalodiglycidyl anilines with other materials a great variety of resins may be used, it is preferred to use other non-flame retardant epoxy resins in order to provide for co-curing and homogeneity of the cured resin structure. Such epoxy resins are preferably polyepoxides having more than one epoxy group

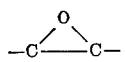

per molecule. The polyepoxides may be saturated or unsaturated, aliphatic, cycloaliphatic, aromatic or heterocyclic and may be substituted with non-interfering substituents such as chlorine, alkoxy groups, etc. They may be monomeric or polymeric.

For clarity, many of the polyepoxides and particularly those of the polymeric type will be described in terms of epoxy equivalent values, which refers to the average number of epoxy group contained in the average molecule. The value is obtained by dividing the average molecular weight of the polyepoxide by the epoxide equivalent weight and as described in U.S. 2,633,458.

If the polyepoxide material is a single compound having all of the epoxy groups intact, the epoxy equivalent value will be an integer, such as 2, 3, 4, and the like. However, in the case of polymeric polyepoxides the material may contain some of the monomeric epoxide or have some of the epoxy groups hydrated or otherwise reacted and/or contain macromolecules of various molecular weights, so that the epoxy equivalency may be quite low and include fractional values greater than 1.0. Another suitable description of epoxide content of an epoxy compound is in terms of epoxy equivalents per 100 grams.

The monomeric polyepoxide compounds may be exemplified by the following: vinyl cyclohexene dioxide, epoxidized soybean oil, butadiene dioxide, 1,4-bis(2,3-epoxypropoxy)benzene, 1,3 - bis(2,3-epoxypropoxy)benzene, 4,4'-bis(2,3-epoxypropoxy)diphenyl ether, 1,8-bis-(2,3-epoxypropoxy)octane, 1,4 - bis(2,3-epoxypropoxy)cyclohexane, 4,4'-bis(2-hydroxy - 3,4 - epoxybutoxy)-diphenyldimethylmethane, 1,3 - bis(4,5-epoxypentoxy)-5-chlorobenzene, 1,4 - bis(3,4-epoxybutoxy)-2-chlorocyclohexane, diglycidyl ether, 1,3-bis(2-hydroxy - 3,4 - epoxybutoxy)benzene, 1,4-bis(2-hydroxy - 4,5 - epoxypentoxy)benzene, 1,2,5,6-di-epoxy - 3 - hexene, 1,2,5,6-diepoxyhexane, and 1,2,3,4-tetra(2-hydroxy - 3,4 - epoxybutoxy)butane.

Other examples of this type include the glycidyl polyethers of the polyhydric phenols obtained by reacting a polyhydric phenol with a great excess, e.g., 4 to 10 mol excess, of a halogen-containing epoxide in an alkaline medium. Thus, Polyether A as described in U.S. 2,633,548 to Shokal, which is a concentrate of 2,2-bis(2,3-epoxypropoxyphenyl) propane, is obtained by reacting bis-phenol-A, (2,2-bis(4-hydroxyphenyl)propane) with an excess of epichlorohydrin. Other polyhydric phenols that can be used for this purpose include resorcinol, catechol, hydroquinone, methyl resorcinol, or polynuclear phenols, such as 2,2 - bis(4-hydroxyphenyl)butane, 4,4'-dihydrobenzophenone, bis(4-hydroxyphenyl)ethane, and 1,5-dihydroxynaphthalene. The halogen-containing epoxides may be further exemplified by 3-chloro-1,2-epoxybutane, 3-bromo-1,3-epoxyhexane, 3-chloro-1,2-epoxyoctane, and the like. Another very suitable group of epoxides comprises epoxidized cyclohexane compounds containing at least two epoxycyclohexyl rings. Typical of these are 3,4-epoxycyclohexylmethyl - 3,4 - epoxycyclohexane-carboxylate and the corresponding homologs having alkyl substituents in the cyclohexane rings. These and related compounds are described in substantial detail in U.S. Patents 2,890,194 through 2,890,197 and in U.S. 2,917,469.

Another very suitable group of epoxides comprising the polyglycidyl ethers of tetraphenols is described in U.S. 2,806,016 to Schwarzer. Typical of these is the polyglycidyl ether of 1,1,2,2-tetrakis(hydroxyphenyl)ethane described in Example I of said patent, which has a melting point of about 85° C. and contains 0.452 epoxy equivalent per 100 grams. Examples of the polymeric polyepoxides, include the polyepoxypolyhydroxy polyethers obtained by reacting, preferably in an alkaline or an acid medium, a polyhydric alcohol or polyhydric phenol with a polyepoxide, such as the reaction product of glycerol and bis(2,3-epoxypropyl)ether, the reaction product of sorbitol and bis(2,3-epoxy-2-methylpropyl)ether, the reaction product of pentaerythritol and 1,2-epoxy-4,5-epoxypentane, and the reaction product of bisphenol and bis-(2,3-epoxy-2-methylpropyl)ether, the reaction product or resorcinol and bis(2,3-epoxypropyl)ether, and the reaction product of catechol and bis(2,3-epoxypropyl)ether.

A further group of polymeric polyepoxides comprises the hydroxy-substituted polyepoxypolyethers obtained by reacting, preferably in an alkaline medium, a slight excess, e.g., 0.5 to 3 mol excess, of a halogen-containing epoxide as described above, with any of the aforedescribed polyhydric phenols, such as resorcinol, catechol, bisphenol, bis(2,2'-dihydroxy-dinaphthyl)methane, and the like.

Also included within this group are the polyepoxide polyethers obtained by reacting, preferably in the presence of an acid-acting compound, such as hydrofluoric acid, one of the aforedescribed halogen-containing epoxides with water or a polyhydric alcohol, such as glycerol, propylene glycol, ethylene glycol, trimethylene glycol, butylene glycol, and the like, and subsequently treating the resulting product with an alkaline component as described in U.S. Patent No. 3,058,921 to Pannell.

Other polymeric polyepoxide compounds include the polymers and copolymers of the epoxy-containing monomers possessing at least one polymerizable ethylenic linkage. When such monomers are polymerized in the substantial absence of alkaline or acidic catalysts, such as in the presence of heat, oxygen, peroxy compound, actinic light, and the like, they undergo addition polymerization at the multiple bond leaving the epoxy group unaffected. These monomers may be polymerized with themselves or with other ethylenically unsaturated monomers, such as styrene, butadiene, vinyl acetate, methylacrylonitrile, acrylonitrile, vinyl chloride, vinylidene chloride, methyl acrylate, methyl methacrylate, diallyl phthalate, vinyl allyl phthalate, divinyl adipate, chloroallyl acetate, and vinyl methallyl pimelate. Illustrative examples of these polymers include poly(allyl 2,3-epoxypropyl ether), poly-(2,3-epoxypropyl crotonate), allyl 2,3-epoxypropyl ether-styrene copolymer, methallyl 3,4-epoxybutyl ether-allyl benzoate copolymer, poly(vinyl 2,3-epoxypropyl ether), allyl glycidyl ether-vinyl acetate copolymer and poly(4-glycidyloxy-styrene).

Other particularly suitable polyepoxides include the condensation products of polycarboxylic acids, polycarboxylic acid anhydrides and mixtures thereof with from 1.5 to four times the chemical equivalent amount of a polyepoxide containing more than one vic-epoxy group, the equivalent amount referring to the amount needed to furnish one acid group per epoxy group. The preparation of such compounds and the various starting materials from which they can be prepared are described in U.S. 2,970,983 to Newey. A representative general formula of these compounds, when prepared from dibasic acids, is as follows:

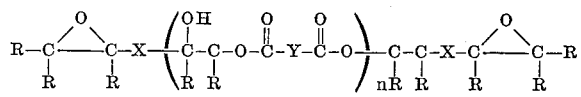

wherein R is hydrogen or hydrocarbon radical, X is organic radical, Y is residue or the dibasic acid and n is an integer and preferably 1 to 10. Particularly preferred are the condensation products of dimer or trimer acids obtained by polymerizing unsaturated fatty acids such as soybean oil fatty acids and the like with diepoxides of the type of Polyether A of said U.S. 2,633,458 to Shokal.

A preferred group of epoxy-containing organic materials are the monomeric and polymeric glycidyl polyethers of dihydric phenols obtained by reacting epichlorohydrin with a dihydric phenol in an alkaline medium. The monomeric products of this type may be represented by the general formula

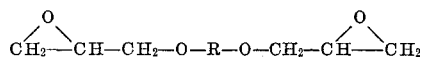

wherein R represents a divalent hydrocarbon radical of the dihydric phenol. The polymeric products will generally not be a single simple molecule but will be a complex mixture of glycidyl polyethers of the general formula

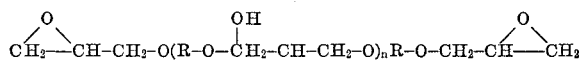

wherein R is a divalent hydrocarbon radical of the dihydric phenol and n is an integer of the series 0, 1, 2, 3, etc. While for any single molecule of the polyether n is an integer, the fact that the obtained polyether is a mixture of compounds causes the determined value for n to be an average which is not necessarily zero or a whole number. The polyethers may in some cases contain a very small amount of materials with one or both of the terminal glycidyl radicals in hydrated form. Molecular weights between about 250 and 900 are preferred.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

Preferred polyepoxy derivatives of dihydric phenols are the reaction products of epichlorohydrin and 2,2-bis-(4-hydroxyphenyl)propane. The simplest member of this group is the diglycidyl ether of the phenol, 2,2-bis(2,3-epoxypropoxyphenyl)propane, which is commercially available in the form of liquid concentrates containing from 70% to nearly 100% of the named product. The substantially pure compound has a viscosity of about 40 poises at 25° C., a molecular weight of about 340 and an epoxy value of about 0.59 equivalent per 100 grams, corresponding to an epoxy equivalency of about 2. A typical commercial concentrate of about 70–80% of the compound has a viscosity of about 127 to 175 poises at 25° C., a molecular weight of about 350 (measured ebullioscopically in ethylene dichloride), an epoxy value of about 0.50 equivalent per 100 grams and a corresponding epoxy equivalency of 1.75. It is illustrated as Polyether A in U.S. 2,633,458 to Shokal. Other polyepoxy derivatives of dihydric phenols are those of Formula 3 where R stands for —O—$C_6H_4(C_3H_6)C_3H_4$—O— and n has average values above zero. For example, products in which the average value of n ranges from 0 to about 4 are useful in this invention. Typical of solid products in this range are those having melting points of about 70° C. and about 98° C., molecular weights of about 900 and about 1400, and epoxide values of about 0.20 and about 0.103 equivalent per 100 grams, respectively. They are illustrated as Polyethers D and E in said Shokal patent.

The epoxide curing agent may be one of a great variety of known epoxy curing agents. Examples of suitable curing agents are alkalies such as sodium or potassium hydroxide; alkali phenoxides like sodium phenoxide; carboxylic acids or anhydrides, such as phthalic anhydride, tetrahydrophthalic anhydride; Nadic methyl anhydride, chlorendic anhydride, pyromellitic anhydride, trimellitic anhydride, succinic anhydride, maleic anhydride, octadecenylsuccinic anhydride, etc. and mixtures thereof; dimer or trimer acids derived from unsaturated fatty acids, 1,20-eicosanedioic acid, and the like; Friedel-Crafts metal halides, such as aluminum chloride, zinc chloride, ferric chloride; or boron trifluoride as well as complexes thereof with ethers, acid anhydrides, ketones, diazonium salts, and those disclosed in U.S. 2,824,083; salts such as zinc fluoborate, magnesium perchlorate, zinc fluosilicate; phosphoric acid and partial esters thereof including n-butyl orthophosphate, diethyl ortho-phosphate and hexaethyltetraphosphate; aliphatic, aromatic and heterocyclic amino compounds, such as, for example, diethylene triamine, triethylene tetramine, tetraethylene pentamine, dicyandiamide, melamine, pyridine, cyclohexylamine, benzyldimethylamine, benzylamine, diethylaniline, triethanolamine, piperidine, tetramethylpiperazine, N,N-dibutyl-1,3-propane diamine, N,N-diethyl-1,3-propane diamine, 1,2-diamino-2-methylpropane, 2,3-diamino-2-methylbutane, 2,4-diamino-2-methylpentane, 2,4-diamino-2,6-diethyloctane, dibutylamine, dioctylamine, dinoylamine, distearylamine, diallylamine, dicyclohexylamine, methylethylamine, ethylcyclohexylamine, pyrrolidine, 2-methylpyrrolidine, tetrahydropyridine, 2,6-diaminopyridine, diaminodiphenylmethane, p,p' - aminodiphenylsulfone, triaminobenzene, ortho-, para-, and metaphenylene diamine, methylene dianiline, diamonotoluene, diaminodiphenyl, diaminostilbene, 1,3-diamino-4-isopropyl benzene and the like, and soluble adducts of amines and polyepoxides and their salts, such as described in U.S. 2,651,589 and U.S. 2,640,037.

Another class of curing agents which may be effectively employed are the polyamides containing active amino and/or carboxyl groups and preferably those containing a plurality of amino hydrogen atoms and prepared by reacting polybasic acids with polyamine such as described in U.S. Patents 2,450,940 and 2,695,908.

In preparing mixtures of the flame retardant resins with other resins, the ratio of resins used depends on the extent of fire retardancy of the final composition desired. Generally, it is necessary to have a bromine content of at least about 14% and at least about 20 to 25% chlorine by weight based on the total composition including curing agent.

The amount of curing agent employed in preparing the cured resin products may be varied over a considerable range depending on the curing agent used as is understood by those skilled in the art. Thus, for example, the amine curing agents may be suitably employed in amounts between about 1 to 25% by weight of the epoxy resins whereas with the phosphoric acids and esters, amounts between about 1 to 10% by weight are suitable. Where anhydride curing agents are utilized, it may be desirable to add a small amount (0.1–5% by weight) of a promoter such as a tertiary amine, stannous octaoate, sulfide, phosphine, etc. to hasten the cure. Curing temperatures between about 0 and 200° C. are suitable.

The compositions of the invention may be used to prepare a great variety of products such as laminates, pottings, castings, coatings, moldings, adhesives and the like.

To illustrate the manner in which the invention is carried out, the following examples are given. Unless otherwise indicated parts disclosed are given by weight.

EXAMPLE I

Aniline (100 g.), 100 cc. of conc. HCl and enough water to bring the total volume to 5 liters were mixed in a reactor cooled in an ice bath. The mixture was stirred while 577 g. of bromine was bubbled through until a distinct yellow color was obtained (about 3–4 hours). The product, 1,3,5-tribromoaniline, was filtered, washed with water, and dried in a vacuum oven. The product had a melting point of 117–119° C. and had the following analysis (percent): Found: C, 21.7; H, 1.3; Br, 72.5. Theory: C, 21.8; H, 1.2; Br, 72.7.

A portion of this product (165 g.) was dissolved in 383 g. of epichlorohydrin. Acetic acid 53 g. was added to the solution which was maintained at 110° C. for about 20 hours. The dichlorohydrin intermediate was then separated from the reaction mixture, dissolved in 400 ml. of methyl ethyl ketone, and treated with 300 ml. of a 20% solution of sodium hydroxide at reflux temperature. The product obtained which was a low melting crystalline solid at room temperature consisted primarily of N,N-bis(2,3-epoxypropyl)-1,3,5-tribromoaniline having the following analysis (percent): Found: C, 32.3; H, 2.8; Br, 55.9; epoxide value, eq. per 100 g., 0.427. Theory: C, 32.7; H, 2.8; Br, 54.3; epoxide value, eq. per 100 g., 0.454.

EXAMPLE II (a) A casting was prepared by mixing 100 parts of the N,N-bis(2,3-epoxypropyl) tribromoaniline prepared in Example I with 12 parts of m-phenylenediamine. The mixture was a low viscosity fluid at room temperature having a viscosity of 2.5 poises. The resin composition was cured 2 hours at 100° C. and 4 hours at 150° C.

(b) By way of comparison 100 parts of a commercially available epoxy resin considered to have highly desirable properties and consisting of a glycidyl polyether (EPON 828—Shell Chemical Co.) prepared by reacting epichlorohydrin and 2,2-bis(4-hydroxyphenyl)propane in an alkaline medium and having the analysis

| | |
|---|---|
| Avg. mol wt. | 380 |
| Hydroxyl content (eq./100 g.) | 0.06 |
| Epoxide (eq./100 g.) | 0.52–0.55 |
| Viscosity, poise, 25° C. | 100–160 | was mixed with 14 parts of m-phenylenediamine diamine was cured as above. The properties of the two castings were as follows:

| | (a) | (b) |
|---|---|---|
| Heat distortion point, ° C | 144 | 146 |
| Izod impact | 0.41 | 0.68 |
| Flexural strength, $10^{-3}$ p.s.i. | 16.2 | 20.7 |
| Modulus, $10^{-5}$ p.s.i. | 7.1 | 4.4 |
| Compressive yield strength, $10^{-3}$ p.s.i. | 35.3 | 18.1 |
| Modulus, $10^{-5}$ p.s.i. | 6.36 | 4.0 |
| Tensile strength, $10^{-3}$ p.s.i. | 9.1 | 12.1 |
| Solvent pick-up after one month, percent w.: | | |
| $H_2O$ | 0.18 | 0.85 |
| 10% NaOH | 0.15 | 0.73 |
| 10% $H_2SO_4$ | 0.17 | 0.85 |
| Acetone | 0.03 | 3.58 |
| Benzene | 0.01 | 0.23 |

EXAMPLE III

Compositions were prepared by mixing flame retardant epoxy resins with non-flame retardant resins which mixtures were then cured at 100° C. for 2 hours and 150° C. for 4 hours.

(a) A mixture of 36% N,N-bis(2,3-epoxypropyl)-tribromoaniline and 64% EPON 828 was prepared having a viscosity of 29 poises at 25° C. 100 parts of the mixture were cured with 13.6 parts of m-phenylenediamine. The bromine content of the composition was 18%.

(b) 100 parts of a mixture of 58% EPON 828 and 42% of the diglycidyl ether of 2,2-bis(3,5-dibromo-4-hydroxyphenyl)propane (a widely used commercially available solid flame retardant epoxy resin) and having a viscosity of 2000 poises at 25° C. was cured with 11.3 parts of m-phenylenediamine. The bromine content of the composition was 18%. By comparison, the properties of the two castings were as follows:

| | (a) | (b) |
|---|---|---|
| Heat distortion point, ° C | 150 | 156 |
| Izod impact | 0.41 | 0.40 |
| Flexural strength, $10^{-3}$ p.s.i. | 22.9 | 21.1 |
| Modulus, $10^{-5}$ p.s.i. | 4.4 | 4.2 |
| Compressive strength, $10^{-3}$ p.s.i. | 21.3 | 18.7 |
| Modulus, $10^{-5}$ p.s.i. | 3.9 | 3.4 |
| Tensile strength, $10^{-3}$ p.s.i. | 8.4 | 7.0 |
| Elongation, percent | 2.5 | 6.1 |
| Solvent pick-up after 1 month, percent w.: | | |
| Water | 0.34 | 0.77 |
| 10% NaOH | 0.27 | 0.68 |
| 10% $H_2SO_4$ | 0.30 | 0.76 |
| Acetone | 0.22 | 3.42 |
| Benzene | 0.07 | 0.23 |
| Fire retardancy: | | |
| Ignition time, NEMA, sec | 70 | 60 |
| Extinction time, NEMA, sec | 12 | 20 |

N,N-diglycidyl-trichloroaniline was prepared using the procedure set forth in Example I. Similar results were obtained from castings prepared from the resin as set forth in Examples II and III.

I claim as my invention:

1. Compounds of the general formula

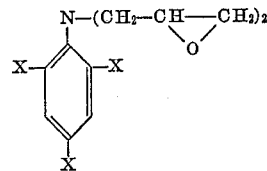

wherein X is selected from the group consisting of chloride and bromide.

References Cited

UNITED STATES PATENTS

| | | | |
|---|---|---|---|
| 2,884,406 | 4/1959 | Wegler | 260—47 |
| 2,951,822 | 9/1960 | Reinking | 260—2 |
| 3,016,362 | 1/1962 | Wismer | 260—47 |
| 3,058,946 | 10/1962 | Nametz | 260—47 |
| 3,218,369 | 11/1965 | Hinkley | 260—47 |
| 3,268,619 | 8/1966 | Nametz | 260—47 |
| 3,280,216 | 10/1966 | Partansky | 260—831 |
| 3,320,209 | 5/1967 | Bremmer | 260—47 |

SAMUEL H. BLECH, *Primary Examiner.*

PAUL LIEBERMAN, *Assistant Examiner.*

U.S. Cl. X.R.

260—2, 18, 47, 78.4, 830, 836